UNITED STATES PATENT OFFICE.

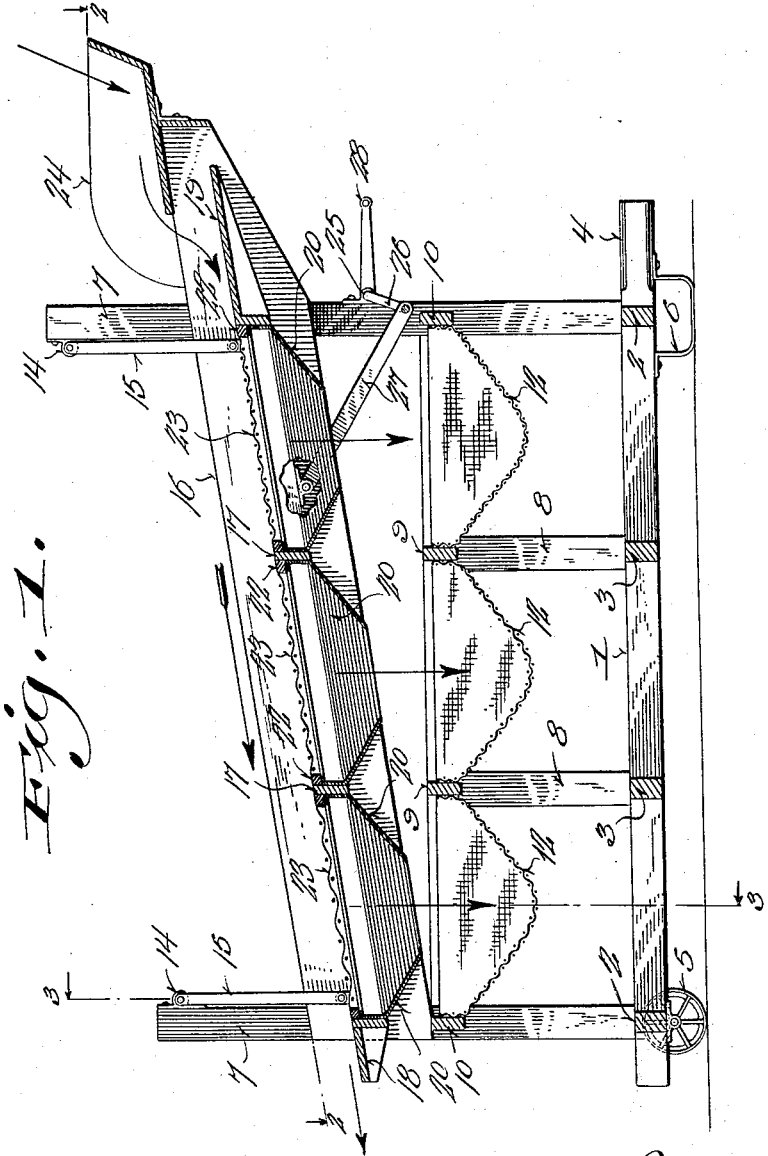

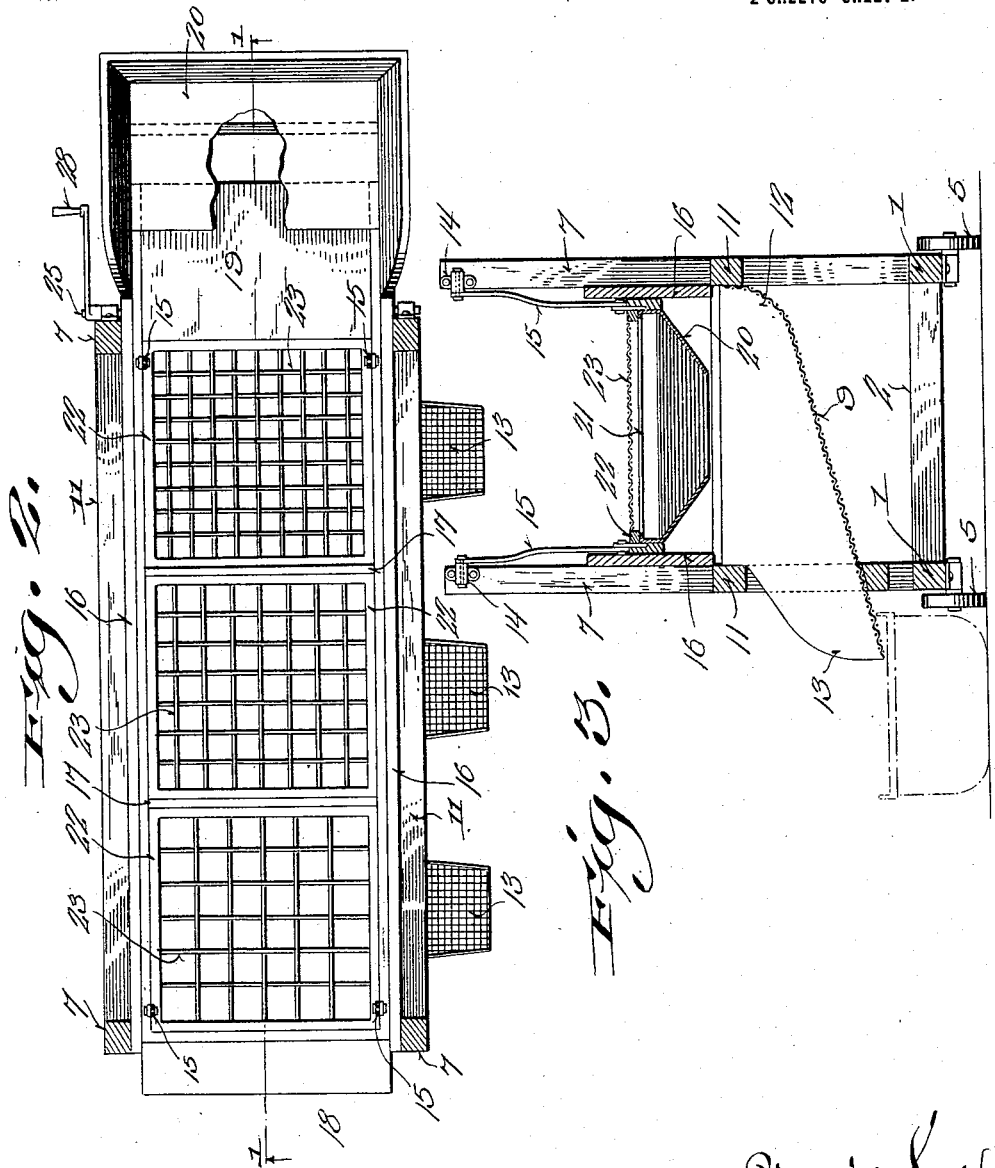

CHARLES A. LARKIN, OF WONEWOC, WISCONSIN.

GRADER.

1,218,782.  Specification of Letters Patent.  Patented Mar. 13, 1917.

Application filed July 6, 1915. Serial No. 38,143.

*To all whom it may concern:*

Be it known that I, CHARLES A. LARKIN, a citizen of the United States, and resident of Wonewoc, in the county of Juneau and State of Wisconsin, have invented certain new and useful Improvements in Graders; and I do hereby declare that the following is a full, clear, and exact description thereof.

This invention relates to the subject of separators and cleaners for vegetables and has more particular relation to machines that will separate or grade vegetables such as potatoes and the like as well as to clear the same of dirt.

The primary aim of the invention is to produce an inexpensive and thoroughly practical grader that will separate the potatoes into four or more grades and simultaneously clear the same of dirt, the grader being one that is portable and which can be readily operated by one person both for grading and for transporting.

In carrying out the objects of the invention as generally stated above, it will be apparent that the improved grader may be embodied in various forms, but for illustrative purposes, one simple and practical embodiment of the invention has been shown in the accompanying drawings, wherein—

Figure 1 is a vertical longitudinal sectional view of a grader constructed in accordance with this invention, the section being taken on the line 1—1, Fig. 2.

Fig. 2 is a top plan view.

Fig. 3 is a vertical transverse sectional view taken on the line 3—3, Fig. 1.

The improved potato grader comprises in its general organization a base frame that may be formed of the spaced parallel longitudinal side bars 1 that are connected adjacent their ends by the transverse strips 2 and at intermediate points by the transverse strips 3, the strips 2 and 3 being arranged in regularly spaced relation. The rear ends of the base bars 1 are preferably formed in the nature of handgrips 4. The forward portion of the base frame is provided with rollers or wheels 5, and adjacent the handgrips, the base frame is provided with rest shoes 6, the shoes 6 and rollers 5 serving to support the base frame in a level position, and the handgrips 4 being adapted to be used when the rear of the machine is lifted from the ground and the machine transported through the medium of the rollers 5. Standards 7 project from the end corners of the base frame, and intermediate but shorter standards 8 are also carried by the said frame, said standards 8 being located at the ends of the braces or strips 3. Partition strips 9 connect the upper ends of the oppositely located standards 8, and similar partitions 10 connect the oppositely located standards 7, the partitions 9 and 10 being in the same horizontal plane. Side guards 11 connect the ends of the partitions 9 and 10, said guards, the partitions, and the standards forming an upper frame that is subdivided into spaces for the reception of the discharge chutes 12 the outlets 13 of which project laterally beyond the side of the machine and into suitable receptacles. Preferably the chutes are formed of screen material so that the vegetables discharged therefrom will be free from dirt and other foreign matter.

The end standards 7 are equipped with hanger brackets 14 to which are journaled the straps 15, the lower portions of the straps 14 being pivotally connected to the side guards 16 of the screen or grader, said guards being connected by the regularly spaced transverse partitions 17, which coöperate with the loading platform 19 and the discharge platform 18 to form compartments for the reception of the hoppers 20. The hoppers 20 correspond in number with, and are disposed directly above, the chutes 9 and their upper ends are formed with horizontally arranged inwardly projecting flanges 21 which form seats for the frames 22 of the screens 23. The arrangement of seats on the hoppers for the screens obviously permits the screens to be interchangeable as well as removable and permits screens of other mesh to be substituted, as will be apparent. The screens are of different mesh, the first screen being a rather fine mesh, the next one larger, and the last one still larger. A chute 24 is carried by the rear ends of the side guards 16 the chute 24 being provided with rear and side guards and overlapping in spaced relation the loading platform 19 so that vegetables from said chute will discharge onto said platform. As will be observed by reference to Fig. 1 of the accompanying drawings, the screens are suspended between the standards 7 and are freely movable therebetween, they being retained on a downward incline by reason of the rear straps 15 being connected to the upper portions of the standards 7, and said rear standards being higher than the forward standards.

A shaft 25 is journaled to the rear standards 7 and is provided with cranks 26 having link connections 27 with the side guards 16 of the screens. Through the medium of the shaft 25 and links 27 the screens are oscillated between the standards 7. Rotary motion may be communicated to the shaft 25 through the handle 28.

In operation, the vegetables are dumped into the chute 25 and from said chute, gravitate longitudinally of the screens, the first screen being a fine mesh one, the small vegetables and finer foreign matter will fall therethrough and into the first of the hoppers 12, where such material is given another screening, the vegetables falling laterally from the chutes and the foreign matter dropping through.

The described operation is continued with the two other screens, the only difference being that in said other screens larger vegetables and larger foreign matter are taken care of. The vegetables that are too large to pass through any of the screens are discharged over the platform 18.

From the foregoing it will be seen that the improved grader will separate the vegetables into four grades, each grade being separately discharged, and further that the operation of separating the grades, also removes all foreign matter therefrom, such foreign matter being discharged entirely separate from the vegetables.

I claim as my invention:—

A grader of the class described comprising a support, a plurality of trough-shaped inclined chutes formed of screening material carried by the lower portion thereof, a carrier formed of guards mounted for longitudinal reciprocable movement within said support, said guards being connected by regularly spaced transverse partitions, a series of hoppers held by said partitions, each of said hoppers having inwardly projecting flanges at its upper extremity and terminating at its lower extremity in a restricted opening for positively delivering articles passing therethrough into an individual one of said chutes, a plurality of grading screens of different meshes removably and interchangeably supported upon the flanges of said hoppers and between said partitions, a feed chute carried by and between the rear ends of said guards arranged to deliver on to the adjacent screen, and means for reciprocating said guards and the parts supported thereby in a longitudinal direction.

In testimony that I claim the foregoing I have hereunto set my hand at Wonewoc, in the county of Juneau and State of Wisconsin, in the presence of two witnesses.

CHARLES A. LARKIN.

Witnesses:
A. P. GALE,
JEAN HENRY.

Copies of this patent may be obtained for five cents each, by addressing the "Commissioner of Patents, Washington, D. C."